G. V. Griffith.
Harvester Rake.

N° 20061         Patented Apr. 27, 1858.

UNITED STATES PATENT OFFICE.

G. V. GRIFFITH, OF SANDUSKY, OHIO.

IMPROVED RAKING ATTACHMENT FOR HARVESTERS.

Specification forming part of Letters Patent No. 20,061, dated April 27, 1858.

*To all whom it may concern:*

Be it known that I, G. V. GRIFFITH, of Sandusky, in the county of Erie and State of Ohio, have invented a new and Improved Raking Attachment for Harvesters; and I do hereby declare that the following is a full, clear, and exact description of the same, reference being had to the annexed drawings, making a part of this specification, in which—

Figure 1 is a side sectional elevation of my improvement, *x x*, Fig. 2, indicating the plane of section. Fig. 2 is a horizontal section of the same, taken in the line *y y*, Fig. 1. Fig. 3 is a detached view of the gearing which communicates motion from the shaft of the revolving rake to the crank of the reciprocating rake.

Similar letters of reference indicate corresponding parts in the several figures.

This invention consists in the employment or use of a revolving and intermittingly reciprocating rake so placed relatively with each other that the planes of their movement are at right angles with each other, and so operated that the revolving rake is made to carry the cut grain from the front end of the platform, near the sickle, to the reciprocating rake, near the back part of the platform, which rake, in consequence of its intermittent movement, discharges the grain in proper gavels upon the ground.

To enable those skilled in the art to fully understand and construct my invention, I will proceed to describe it.

A represents the platform of a reaper, to the front end of which the sickle is attached and operated as usual.

To each side of the platform A an upright, B, is attached, and a shaft, C, is fitted in the upper ends of these uprights.

On the shaft C two small frames, D D, are placed and rigidly secured to it, the frames being at right angles with the shaft. The ends of each frame D are bent at right angles with its central portion, as shown at *a*, and each bent portion *a* has two friction-rollers, *b*, fitted within it, four friction-rollers being in each frame. In each frame D a cylindrical rod, E, is fitted. These rods pass between the rollers *b*, the peripheries of which are grooved to receive them. The lower ends of the rods E are connected by a cross-bar, *c*, having teeth *d* attached, and forming a rake, F, which is nearly equal in width to the platform.

On each end of the bar *c* a friction-roller, *e*, is placed. These rollers are fitted in grooves or guides G, which are made in plates or side pieces, H H, attached one to each upright B. The form of these grooves or guides is plainly shown in Fig. 1, the upper parts, *f*, being of semicircular form, the front parts, *g*, being inclined, but straight, the bottom parts, *h*, being perfectly horizontal, and the back parts, at the lower ends, *i*, perfectly vertical until they join the curved portions *f*.

To one end of the shaft C a part pinion, I, is attached, the teeth *j* of which gear intermittingly into a pinion, J, on one end of a shaft, K, which shaft has a crank, *k*, attached to its opposite end. The shaft K is fitted in proper bearings, *a'*, at right angles with the shaft C, and the gearing which connects them is bevel-gear.

L is a spring, which is attached to a bar, M, which supports the outermost bearing of the shaft C. The upper end of this spring has a pin, *l*, attached to it, which, when the shaft K is stationary, fits in a hole in the back of pinion J. To the shaft C, adjoining the front pinion, I, an arm, N, is attached. (See more particularly Fig. 3.)

To the crank *k* of the shaft K a rake-rod, O, is attached. P is the rake, which is formed with three or more teeth, *m m n*, the central one, *n*, having an eye formed on its lower end, said eye working on a rod, *o*, which is fitted in a groove transversely in the platform, and serves as a guide to the rake D.

The operation is as follows: As the machine is drawn along the shaft C is rotated in any proper way from the driving-gear, and as said shaft rotates the rake F is rotated through the medium of the frames D and friction-rollers *b*, the rods E being allowed to slide between the rollers *b* to permit the rake to be guided by the grooves G. The rake F sweeps horizontally over the platform A in consequence of the horizontal parts *h* of the grooves or guides G, and as the rake is raised it is drawn inward by the vertical portions *i* of the grooves or guides, and is gradually drawn inward as the rollers *e* pass around the semicircular portions $f$ of the guides, and when the rollers reach the front ends of said parts $f$ the rake rapidly and obliquely descends, the rollers $e$ being in the parts $g$, the rake, in consequence of descending in this position, being about in line with the grain being cut, so that the rake, as it reaches the termination of its downward movement, instantly divides the cut grain from the standing grain or that which is being cut, and immediately conveys it back on the platform as far as the length of its horizontal movement. As soon as the rake F ascends and gets a short distance upward in the vertical part $i$ of the grooves or guides G, the rake P is operated in consequence of the projection N on the shaft C throwing the pin $b$ out of the pinion J, and the toothed part $j$ of the pinion I gearing into the pinion J. The shaft K is rotated one revolution, and the crank $k$ moves the rake P across the platform A in the direction indicated by the arrow 1, the rake by said movement raking off the gavel deposited in its path by the rake F. When the rake P reaches the edge of the platform it is moved by the crank in the opposite direction across the platform, as indicated by arrow 2, and remains at the edge of the platform in the position as shown in Fig. 2 until the rake F leaves a succeeding gavel in its path, when the projection N again liberates the pinion J and the rake P is operated, as before. The pin $l$ passes into the hole in the pinion as soon as the tooth $j$ of the pinion I leaves the teeth of the pinion J, said pin preventing the casual movement of rake P.

By this simple device the cut grain is raked from the platform in an effectual manner. Two rakes being employed, the labor is divided between them, each having comparatively a quite limited movement, and as but little gearing is employed the device works with but little friction.

I do not claim separately any of the parts herein described, for I am aware that reciprocating and rotating rakes have been previously used; but I am not aware that a reciprocating and rotating rake combined and operated as herein shown have been used.

I claim therefore as new and desire to secure by Letters Patent—

1. The rotating rake F and the reciprocating rake P, combined and arranged to operate conjointly, as and for the purpose herein set forth.

2. The particular manner of operating respectively the rakes F P, as herein described—to wit, through the medium of the grooves or guides G G, gearing I J, which connect the two shafts C K, and the crank $k$ on shaft K.

GEO. V. GRIFFITH.

Witnesses:
   D. C. HENDREZEN,
   TENAS W. BARKER.